US012608003B2

(12) United States Patent
 Blume

(10) Patent No.: US 12,608,003 B2
(45) Date of Patent: Apr. 21, 2026

(54) MATERIAL DETECTION AND HANDLING OF MATERIAL IRREGULARITIES

(71) Applicant: AGCO International GmbH, Neuhausen (CH)

(72) Inventor: Tobias Blume, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 281 days.

(21) Appl. No.: 17/804,086

(22) Filed: May 25, 2022

(65) Prior Publication Data

US 2022/0382290 A1    Dec. 1, 2022

(30) Foreign Application Priority Data

May 26, 2021    (GB) ..................................... 2107499

(51) Int. Cl.
 *G05D 1/00*      (2024.01)
 *A01B 69/04*     (2006.01)
 *G05D 1/221*     (2024.01)
 *G05D 105/15*    (2024.01)

(52) U.S. Cl.
 CPC ......... *G05D 1/0219* (2013.01); *A01B 69/008* (2013.01); *G05D 1/00* (2013.01); *G05D 1/221* (2024.01); *G05D 2105/15* (2024.01)

(58) Field of Classification Search
 CPC ... G05D 1/0219; G05D 1/0246; A01B 69/008
 See application file for complete search history.

(56) References Cited

U.S. PATENT DOCUMENTS

| | | | | |
|---|---|---|---|---|
| 8,214,111 | B2 * | 7/2012 | Heiniger | .............. G05D 1/0278 701/50 |
| 11,582,903 | B1 * | 2/2023 | Brown | .................. B60W 10/20 |
| 2005/0102079 | A1 | 5/2005 | Hofer et al. | |
| 2008/0065286 | A1 * | 3/2008 | Han | ...................... G01S 19/485 701/28 |

(Continued)

FOREIGN PATENT DOCUMENTS

| | | | | |
|---|---|---|---|---|
| EP | 1769662 | A1 | 4/2007 | |
| JP | 2019170271 | * | 10/2019 | ............. A01B 69/00 |
| WO | 2020/037003 | A1 | 2/2020 | |

OTHER PUBLICATIONS

Zhang, Xiya et al. "Automated Robust Crop-Row Detection in Maize Fields Based on Position Clustering Algorithm and Shortest Path Method." Computers and electronics in agriculture 154 (2018): 165-175. Web. (Year: 2018).*

(Continued)

*Primary Examiner* — Joan T Goodbody

(57) ABSTRACT

Methods and systems for guiding movement of an agricultural system within a field including sensor data indicative of an environment of the agricultural system used to identify a material profile along which the agricultural system shall be guided, one or more properties of the material profile determined from the sensor data and in particular properties indicative of an irregularity in the material profile, determination of a correcting path segment for guiding movement of the agricultural system with respect to the material profile irregularity, and movement of the agricultural system controlled along the determined correcting path segment.

15 Claims, 6 Drawing Sheets

(56)        References Cited

U.S. PATENT DOCUMENTS

2009/0118904 A1*  5/2009  Birnie .................. A01B 69/008
                                                               701/41
2018/0188366 A1*  7/2018  Kemmer ............. A01F 15/0825
2018/0373264 A1   12/2018  Madsen et al.
2019/0208695 A1*  7/2019  Graf Plessen ....... A01B 69/008
2022/0382290 A1*  12/2022  Blume ................. G05D 1/0246

OTHER PUBLICATIONS

Souza, Iuri R., Mauricio C. Escarpinati, and Daniel D. Abdala. "A Curve Completion Algorithm for Agricultural Planning." Proceedings of the 33rd Annual ACM Symposium on Applied Computing. New York, NY, USA: ACM, 2018. 284-291. Web. (Year: 2018).*
JP-2019170271-A translation (Year: 2019).*
Mohammadreza Beygifard Automated driving for a UGV for agriculture 4.0. Politecnico di Torino, Corso di laurea magistrale in Mechatronic Engineering (Ingegneria Meccatronica) Thesis, 2020 (Year: 2020).*
J. A. R. Silva and V. Grassi, "Clothoid-Based Global Path Planning for Autonomous Vehicles in Urban Scenarios," 2018 IEEE International Conference on Robotics and Automation (ICRA), Brisbane, QLD, Australia, 2018, pp. 4312-4318, (Year: 2018).*
S. Sedighi, D. . -V. Nguyen, P. Kapsalas and K. . -D. Kuhnert, "Implementing Voronoi-based Guided Hybrid A* in Global Path Planning for Autonomous Vehicles, " 2019 IEEE Intelligent Transportation Systems Conference (ITSC), Auckland, New Zealand, 2019, pp. 3845-3852, (Year: 2019).*
Executive summary, J. Giesbrecht Defence R&D Canada—Suffield, Global Path Planning for Unmanned Ground Vehicles, Technical Memorandum DRDC Suffield TM 2004-272 Dec. 2004 (Year: 2004).*
Mohammadreza Beygifard, Automated driving for a UGV for agriculture 4.0., Rel Politecnico di Torino, Corso di laurea magistrale in Mechatronic Engineering (Ingegneria Meccatronica) Thesis, 2020 (Year: 2020).*
UK Intellectual Property Office, Search report for UK priority Application No. GB2107499.2, dated Feb. 4, 2022.
Zhang Xiya et al, "Automated robust crop-row detection in maire fields based on position clustering algorithm and shortest path method", Computers and Electronics in Agriculture, 2018, vol. 154, pp. 165-175, as cited in GBSR.
Souza, et al., "A curve completion algorithm for agricultural planning", Applied Computing, 2018, pp. 284-291, as cited in GB SR.

* cited by examiner

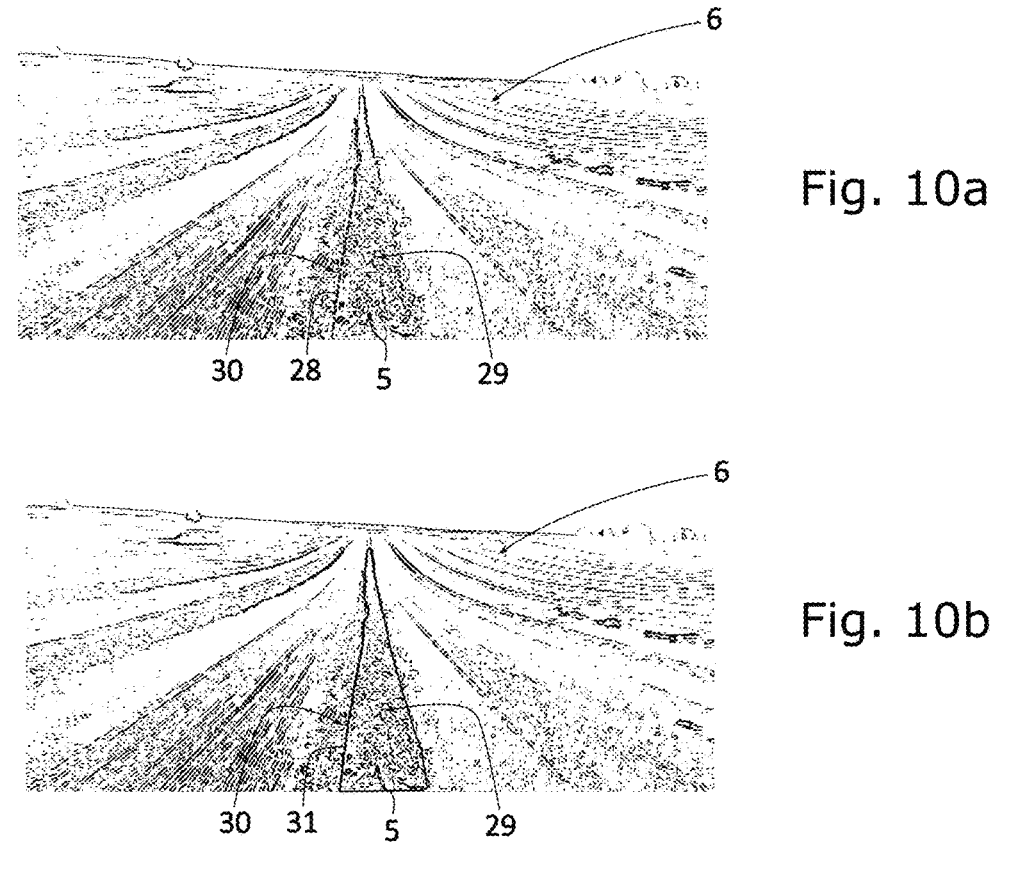
Fig. 10a
Fig. 10b
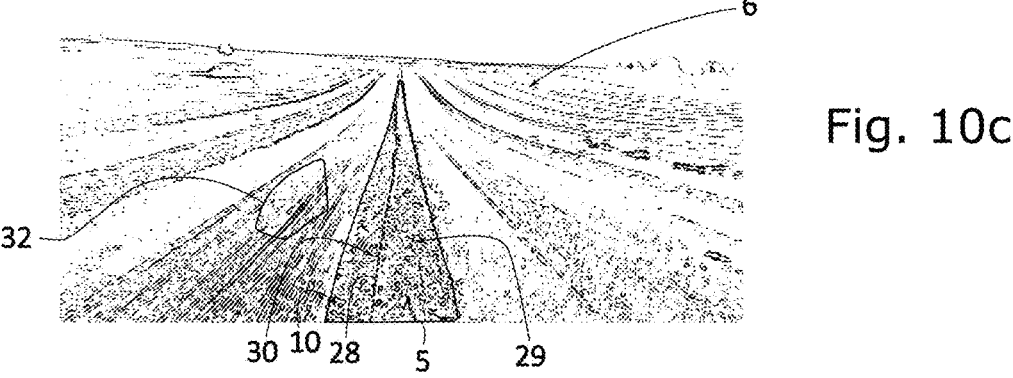
Fig. 10c
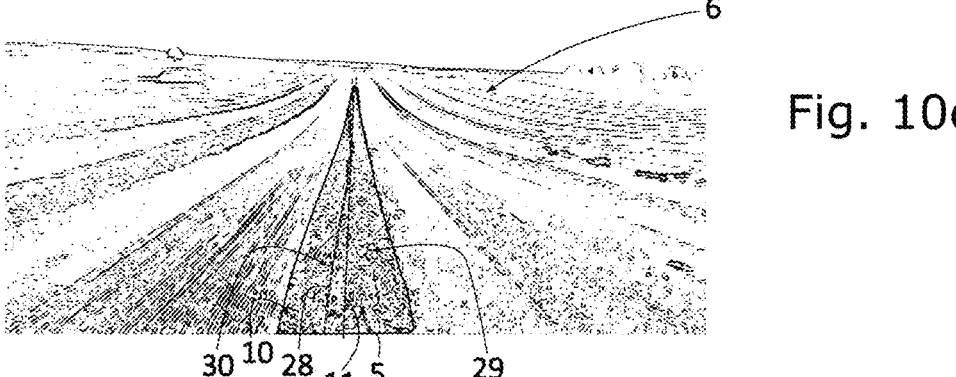
Fig. 10d

MATERIAL DETECTION AND HANDLING OF MATERIAL IRREGULARITIES

TECHNICAL FIELD

The present invention relates, in general, to systems and methods for detecting irregularities in swath (e.g. in its profile/distribution in an environment), and optionally controlling operation of an agricultural machine based thereon.

BACKGROUND

It is known to generate guidance paths for agricultural machines within an environment. However, to date, no complete solution has been provided which accounts for irregularities in material, e.g. crop material, windrow/swath profiles etc. each of which may generally not be completely uniform across a field and may vary in time.

It is an aim of the present invention to overcome or at least partially mitigate one or more problems associated with the prior art.

SUMMARY OF THE INVENTION

In an aspect of the invention there is provided a method of guiding movement of an agricultural system within a field, the method comprising: receiving sensor data indicative of an environment of an agricultural system; identifying, from the sensor data, a material profile along which the agricultural system shall be guided; determining one or more properties of the material profile from the sensor data indicative of an irregularity in the material profile; determining a correcting path segment for guiding movement of the agricultural system with respect to the determined material profile irregularity; and controlling movement of the agricultural system along the determined correcting path segment.

Advantageously, the present invention may provide means to automatically guide an agricultural system to more efficiently account for observed irregularities in the material profile.

When used herein and throughout the specification the term "material" is intended to cover any material type encountered by the agricultural system, and can include, for example, swath material, crop or the like. The material profile may relate to the profile/form of a swath windrow, crop row, etc. which may include size, shape, contours, etc. as discussed herein.

The sensor data may be received from an environment detection system having one or more sensors, which may be mounted or otherwise coupled to the agricultural system. The one or more sensors may include an imaging sensor, which may be a camera, LIDAR, infrared sensor, or the like. The one or more sensors may include a RADAR sensor, or ultrasonic sensor, for example.

The correcting path segment may be determined in dependence on the kinematic capabilities of the agricultural system, e.g. maximum steering angle, etc.

The method may comprise executing one of at least two path planning procedures for determining a guidance path for the agricultural system.

A first path planning procedure may comprise determining the correcting path segment with respect to a global path. The global path may comprise a base guidance path for the agricultural system within the environment, and may be predetermined. The global path may be determined during a previous operation within the environment. This may include a global path determined during a previous harvesting operation within the environment, or a previous raking operation within the environment, for example. This may include a global path determined in dependence on a material distribution observed during the previous operation. The global path may be determined in dependence on data received from a remote sensing unit. The remote sensing unit may comprise, or be mounted or otherwise attached to a vehicle which may be configured to observe the environment. For instance, the remote sensing unit may comprise (or be attached to) a UAV, or the like, operable to obtain sensor data indicative of the material distribution within the environment prior to operation of the agricultural system.

The first path planning procedure may comprise determining the correcting path segment as a guidance path between the current location of the agricultural system and the global path. The first path planning procedure may comprise determining the correcting path segment as a guidance path from the position of the beginning of an irregularity in the material profile. The guidance path may follow a profile of the global path. The guidance path may be a path between the position of the beginning of the material profile irregularity and a position on the global path corresponding to the end of the swath profile irregularity. The guidance path may be between the current location of the agricultural system and a position on the global path corresponding to the end of a material profile irregularity.

The method may comprise determining whether the global path is available, for example whether it is stored within a memory storage means accessible by the agricultural system (or a control unit controlling operation thereof). One or more alternative path planning procedures may be performed where the global path is not available or has not been determined.

The method may comprise determining a location of the agricultural system within the environment. For example, the method may comprise the use of a positioning system, such as a Global Navigation Satellite System (GNSS), e.g. GPS, GLONASS, Galileo or the like, and/or a local positioning system to determine the location of the agricultural system within the environment. The method may comprise determining whether the location of the agricultural system corresponds to the location of a headland within the environment.

A second path planning procedure may be performed in dependence on whether the agricultural system is determined not to be located in a headland of the environment.

The second path planning procedure may comprise analysing the sensor data and determining therefrom all data points which correspond to material within the environment. For example, where the sensor comprises an imaging sensor, the method may comprise analysing image data therefrom to determine all image points within the image data corresponding to material within the environment of the system.

The second path planning procedure may comprise determining a global path in dependence on an identification of a section of swath within the environment, which may be ahead of the position of the agricultural system. The global path may comprise a substantially straight guidance path between the current location of the agricultural system and a location of the furthest observed material position ahead of the agricultural system. One or more further paths may be defined in dependence on the global path, e.g. a global path for a future pass of the environment, which may include a global path for one or more parallel rows of the environment.

The second path planning procedure may comprise determining a guidance path for the agricultural system in dependence on the determined global path, e.g. in the manner described herein with reference to the first path planning procedure.

The second path planning procedure may comprise determining a correcting path segment between two sections of material. Here, the irregularity in the material profile may comprise a section of the environment where no material is present, and the method may comprise determining a correcting path segment between the end of a first section of material and the beginning of a second section of material.

A third path planning procedure may performed in dependence on whether the agricultural system is determined to be located within the headland of the environment. The method may comprise determining whether information indicative of a field contour of the environment is available. If the field contour is not available, the method may comprise performing the third path planning procedure, which may include analysing the sensor data and determining therefrom all data points which correspond to material within the environment.

Here, the irregularity in material profile may correspond to the end of a first row of material and the beginning of a second row of material. The third path planning procedure may comprise identifying a curved contour of material traversed or to be traversed by the agricultural system, and determining a radius of curvature of the curved contour therefrom. This may comprise identifying two or more (preferably three) points of a traversed path for the current section of material and extrapolating therefrom to determine the correcting path segment as an extension of a (part) circular path passing through the points of the curved contour and extending from the beginning of an irregularity in the material profile at least partly towards an end of the irregularity in the material profile.

If the information indicative of the field contour is available, the method may comprise performance of a fourth path planning procedure. Here, the field contour may comprise information relating to a boundary or border of the environment, e.g. an edge of the field.

The fourth path planning procedure may comprise determining an offset between a boundary of the field and one or more sections of material corresponding to a regular material profile. The offset may comprise a distance between the boundary and the location of the regular material profile. This distance may be determined from analysis of the positions of a guidance path correlating to the swath position and the boundary, and/or from a position of the system which respect to the boundary, e.g. using a positioning system in the manner discussed herein. In a further embodiment, the offset may be defined manually by an operator of the system.

The fourth path planning procedure may comprise determining a guidance path for the system which is correlated to the field contour, where the field contour correlated path is spaced from the boundary of the environment by the offset distance, or at least in dependence on the offset distance. A correcting path segment may be defined with respect to the field contour correlated path, e.g. a guidance path which starts from the beginning of the irregularity in the material profile, following the general contour of, but offset from, the boundary.

The one or more material profile properties may include one or more edges of the material. The one or more properties may include a contour of the material profile. The method may comprise identifying one or more properties corresponding to a flatness of the material profile. For example, the method may comprise identifying flattened material from the sensor data. The method may comprise determining a flatness of the material from a contour of a material profile identified from the sensor data.

The method may comprise receiving sensor data from a sensor having a three-dimensional sensing region. Additionally or alternatively, the method may comprise receiving sensor data from a sensor having a two-dimensional sensing region. The method may comprise determining the one or more material profile properties from a fusion of sensor data from a sensor having a three-dimensional sensing region and a sensor having a two-dimensional sensing region. The method may comprise performing an image object recognition process on the sensor data received from first and second sensors, and correlating the two to identify one or more material edges present in the sensor data.

A material profile irregularity may correspond to disrupted material, e.g. where there is an interruption in the material profile (e.g. between regions of material) or flattened material where a contour of the identified material profile is substantially flat, or flatter than an expected contour for material in that region.

The method may comprise identifying an end of a material profile irregularity. The method may comprise analysing sensor data to identify the end of a material profile irregularity. In the case of disrupted material, the method may comprise determining an end of a material profile irregularity at a point where a further section of material is identified in the sensor data, e.g. a region of uniform or regular material ahead of the agricultural system. In the case of flattened material, the method may comprise determining an end of a material profile irregularity at a point where the contour or profile of the material profile is no longer flattened, e.g. is identifiable in the sensor data as having an expected profile for uniform/regular material.

The method may comprise determining a primary guidance path for the agricultural system for a region of the field beyond the material profile irregularity, e.g. for a region of the field corresponding to uniform/regular material. The primary guidance path may be provided or determined along a contour of the regular material region. The method may comprise defining a beginning of the guidance path at an identified end of a material profile irregularity. The method may therefore comprise determining a correcting path segment between the location of the system and the end of the material profile irregularity to guide the system from its current location to the primary guidance path.

In a further aspect of the invention there is provided computer software comprising computer readable instructions which, when executed by one or more processors, causes performance of the method of the preceding aspect of the invention.

A further aspect of the invention provides a computer readable storage medium comprising the computer software of the preceding aspect of the invention. Optionally, the storage medium comprises a non-transitory computer readable storage medium.

A yet further aspect of the invention provides a control system for controlling movement of an agricultural system within a field, the control system comprising one or more controllers, and being configured to: receive sensor data indicative of an environment of an agricultural system; identify, from the sensor data, a material profile along which the agricultural system shall be guided; determine one or more properties of the material profile from the sensor data indicative of an irregularity in the material profile; determine a correcting path segment for guiding movement of the agricultural system with respect to the determined material profile irregularity; and control movement of the agricultural system along the determined correcting path segment.

The one or more controllers may collectively comprise an input (e.g. an electronic input) for receiving one or more input signals, e.g. signals containing the sensor data indicative of the environment of the agricultural system. The one or more controllers may collectively comprise one or more processors (e.g. electronic processors) operable to execute computer readable instructions for controlling operation of the control system, for example to analyse the sensor data and determine therefrom the correcting path segment. The one or more processors may be operable to generate one or more control signals for controlling one or more subsystems of the agricultural system for controlling movement of the system along the determined correcting path segment. The one or more controllers may collectively comprise an output (e.g. an electronic output) for outputting the one or more control signals to the relevant subsystem controllers for controlling motion of the agricultural system.

The control system may be communicable with one or more subsystem controllers operable to control movement of the agricultural system. This may include a steering system of a vehicle forming at least part of the agricultural system, such as a steering system for a tractor, harvester, baler or the like. The one or more subsystem controllers may relate to a propulsion system of the agricultural system which may, for example, be operable to control an operational speed (e.g. a forward speed) of the agricultural system.

The control system may be communicable with an environment detection system having one or more sensors, which may be mounted or otherwise coupled to the agricultural system. The one or more sensors may include an imaging sensor, which may be a camera, LIDAR, infrared sensor, or the like. The one or more sensors may include a RADAR sensor, or ultrasonic sensor, for example.

The correcting path segment may be determined in dependence on the kinematic capabilities of the agricultural system, e.g. maximum steering angle, etc.

The one or more controllers may be configured to execute one of at least two path planning procedures for determining a guidance path for the agricultural system. This may include one or more of the first path planning procedure, the second path planning procedure, the third path planning procedure and/or the fourth path planning procedure as detailed herein.

The one or more material profile properties may include one or more edges of the material profile. The one or more material profile properties may include a material profile contour. The control system may be configured to identify one or more properties corresponding to a flatness of the material profile.

The one or more controllers may be configured to identify an end of a material profile irregularity. This may include analysing sensor data to identify the end of a material profile irregularity. In the case of disrupted material, the controller(s) may be configured to determine an end of a material profile irregularity at a point where a further section of material is identified in the sensor data, e.g. a region of uniform or regular material ahead of the agricultural system. In the case of flattened material, the controller(s) may be configured to determine an end of a material profile irregularity at a point where the contour or profile of the material is no longer flattened, e.g. is identifiable in the sensor data as having an expected profile for uniform/regular material.

The controller(s) may be configured to determine a primary guidance path for the agricultural system for a region of the field beyond the material profile irregularity, e.g. for a region of the field corresponding to uniform/regular material. The primary guidance path may be provided or determined along a contour of the regular material region. This may include defining a beginning of the guidance path at an identified end of a material profile irregularity. A correcting path segment may be defined between the location of the system and the end of the material profile irregularity to guide the agricultural system from its current location to the primary guidance path.

In a further aspect of the invention there is provided a system for guiding movement of an agricultural system within an environment, the system comprising: the control system of the preceding aspect of the invention and an environment detection system.

A further aspect of the invention provides an agricultural system comprising the control system and/or system described herein.

The agricultural system may include an agricultural vehicle, which may include a tractor, harvester, baler or the like. The agricultural system may include an implement, which may be forward facing or towed by a vehicle forming part of the system.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention will now be described, by way of example only, with reference to the accompanying drawings, in which:

FIGS. 10a-10d are a series of images illustrating the operational use of one or more aspects of the invention.

DETAILED DESCRIPTION

Figure 1:
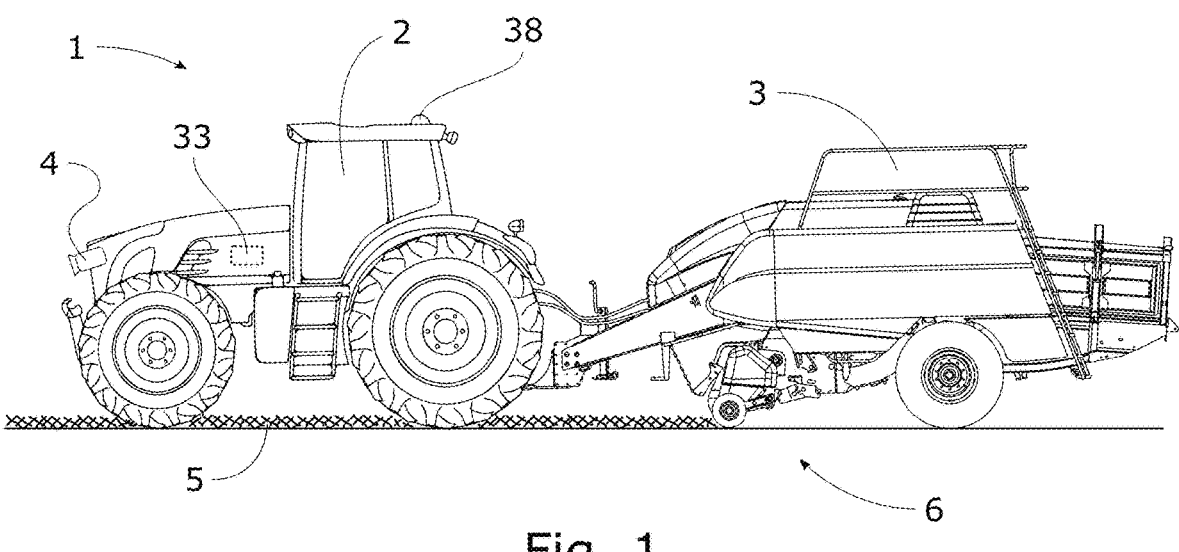
FIG. 1 is a schematic side view of a tractor/implement combination embodying one or more aspects of the invention.

FIG. 1 shows an agricultural system 1 comprising a tractor 2-implement 3 (e. g. a baler) combination guided over a swath 5 on an agricultural field 6. An environment detection system 4 attached to the tractor 2, e.g. at the front or on the roof, is used to detect the swath 5. The environment detection system 4 can be of any type that is able to capture the environment, especially the crop in terms of the swath 5 or a crop row, being ahead of the agricultural system 1. The environment detection system can comprise at least one of a camera sensor, a LIDAR sensor, a radar sensor, an ultrasonic sensor or any other appropriate sensor. A control unit 33 evaluates the sensor data and takes over the guidance, especially the transverse and/or longitudinal control, of the agricultural system 1.

Figure 9:
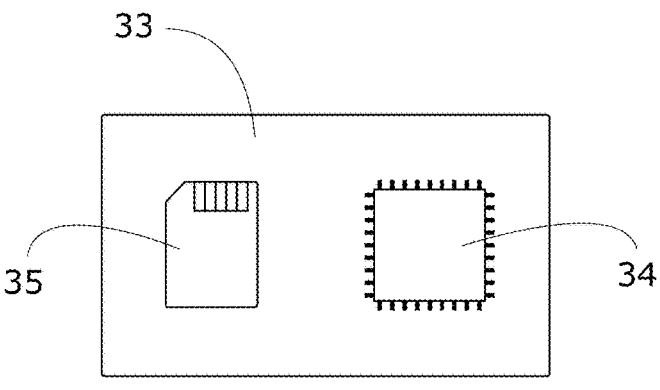
FIG. 9 is a schematic view of an embodiment of a control unit of the present invention.

The environment detection system 4 is connected with the control unit 33 and transfers all sensor data to the control unit 33. Optionally, the environment detection system 4 comprises a separate controller to calculate post-processed data of the sensor data. FIG. 9 shows the control unit 33 comprising a memory 35 and a controller 34. The controller 34 can execute all functions to control the agricultural system 1.

The invention will be explained by reference of a swath 5, 7, 8 or 9 lying on the field 6. But the invention is not limited to a swath/windrow and can be used in conjunction with any other type of a crop row, as for example corn, grain or vegetables.

Figure 2:
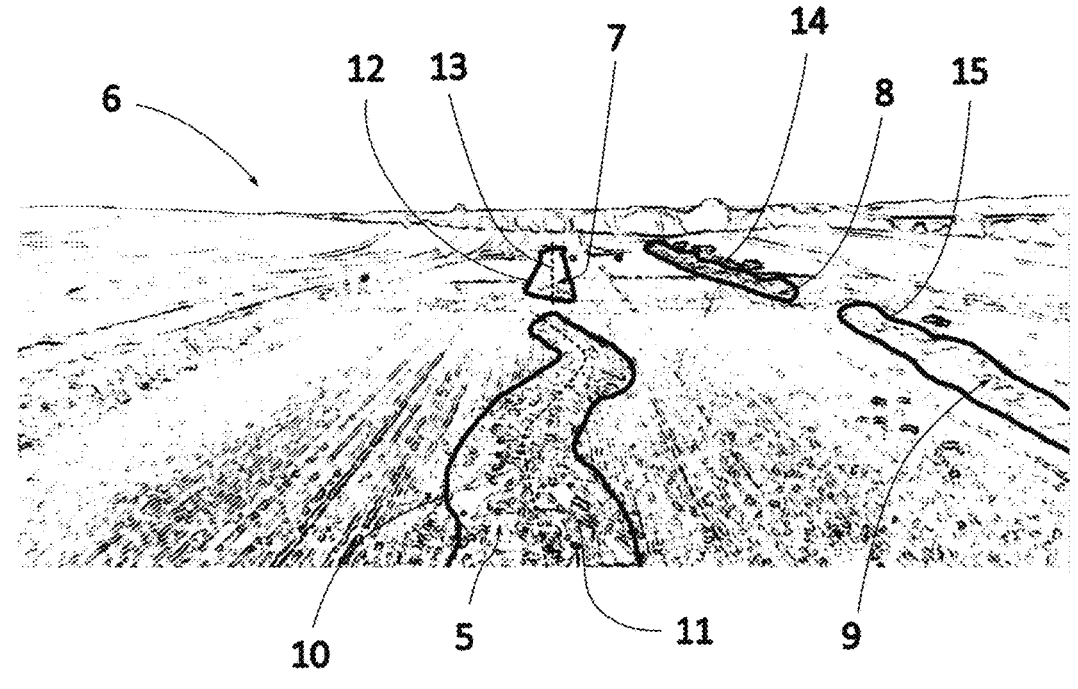
FIG. 2 is an annotated image illustrating the operational use of one or more aspects of the invention.

FIG. 2 shows a situation in the agricultural field 6 captured by the environment detection system 4. The control unit 33 detects several swaths 5, 7, 8 and 9 and identifies their corresponding edges 10, 12, 14 and 15 defining the contour of the corresponding swaths. The control unit 33 calculates also a first path 11 correlated to the contour of the first swath 5 and a second path 13 correlated to the contour of the second swath 7 the agricultural system 1 shall be guided along to collect the swath 5 and 7 by the implement 3. The path calculation can be executed by the control unit 33 and can be based on different methods known from the prior art, e. g. in the manner described in European Patent EP 1 926 364B; and/or US Patent Application no. US 2005/102079.

As depicted in FIG. 2, the edges 10, 12, 14 and 15 of the swaths 5, 7, 8 and 9 have irregularities. For example, swath 5 and swath 7 are not continuously connected, i. e. interrupted. Thus, when the agricultural system 1 approaches the beginning of the swath irregularity 20, i. e. the end point of the first path 11, the guidance process needs to be continued to cause the agricultural system 1 to follow the second path 13 of the second swath 7.

Figure 4:
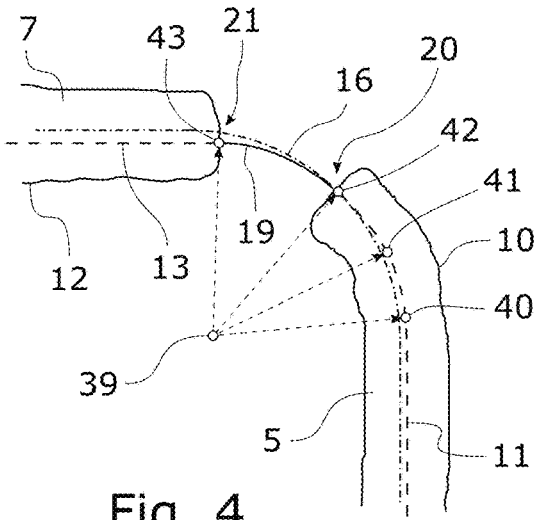
FIGS. 3 to 5 are a series of top-down schematic views of a harvesting environment illustrating one or more aspects of the invention.
Figure 3:
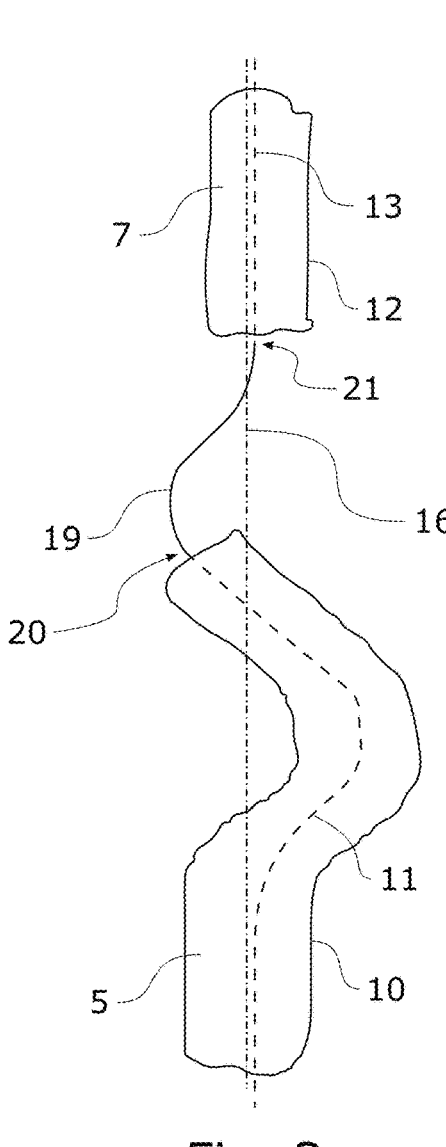

FIGS. 3 and 4 shows a gap in the swath in detail. FIG. 3 describes a common situation in the field 6, whereas FIG. 4 may occur in the headland or islands in the field 6. The agricultural system 1 moves over the first swath 5 along the Swath correlated path 11 to the beginning of the irregularity 20 wherein the edge 10 of the first swath 5 is detected by the environment detection system 4. At the beginning of the irregularity 20, the first swath 5 is disrupted from the second swath 7. If the gap between the first and second swaths 5 and 7 is too large, the end of the irregularity 21, i. e. the starting point of the second path 13 correlating to the second swath 7, cannot be sufficiently detected by the Environment detection system 4. Thus, the control unit 33 can't calculate a valid path to continue the movement of the agricultural system 1 and the path guidance process will be interrupted (at the beginning of the irregularity 20).

Figure 5:
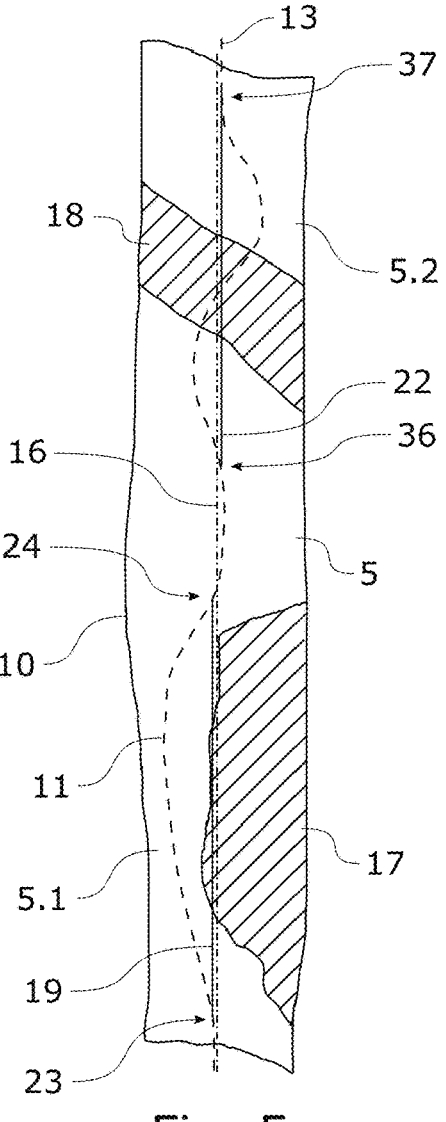

FIG. 5 shows another type of a swath irregularity. The swath 5 is flattened in different places, e. g. at a first area of flattened swath 17 or at a second area of flattened swath 18. In this case, the path 11 correlated to swath 5 does not guide the agricultural system 1 centrally over the entire swath 5. Thus, the implement 3 may not collect the swath 5 the between the beginning of the irregularity 23 and the end of the irregularity 24 completely and miss the swath located at the area of the flattened swath 17 at least in part. If the irregularity of the swath 5, i.e. the fattened area, extends too much the environment detection system 4 cannot sufficiently find the end of the irregularity 24. The same applies to the second area of flattened swath 18 between a beginning of the irregularity 36 and an end of the irregularity 37.

So, it is an object of the invention to guide the agricultural system 1 through the swath or crop row irregularity as far as the environment detection system 4 can detect the end of the irregularity and to continue the guidance of the agricultural system 1 based on a regular behaviour of the swath or the crop row.

According to the invention, the control unit 33 is configured to determine a correcting path segment 19 to guide the agricultural system 1 from the beginning of the irregularity 20 (i. e. the end point of the path 11 correlated to the swath 5) to the end of the irregularity 21 (i. e. the starting point of the path 13 correlated to the swath 7) to overcome with swath irregularities according to FIG. 3 or FIG. 4.

Analogously, the control unit 33 is configured to determine correcting path segment 19 or 22 to guide the agricultural system 1 from the beginning of the irregularity 23 or 36 of the swath 5 to the end of the irregularity 24 or 37 of the swath 5 to overcome with swath irregularities according to FIG. 5.

In both situations, the correcting path segment 19 or 22 is designated to let the agricultural system 1 approach to the end of the irregularity of the swath or the crop row so that the end of the irregularity can be found and detected by the environment detection system 4.

Figure 6A:
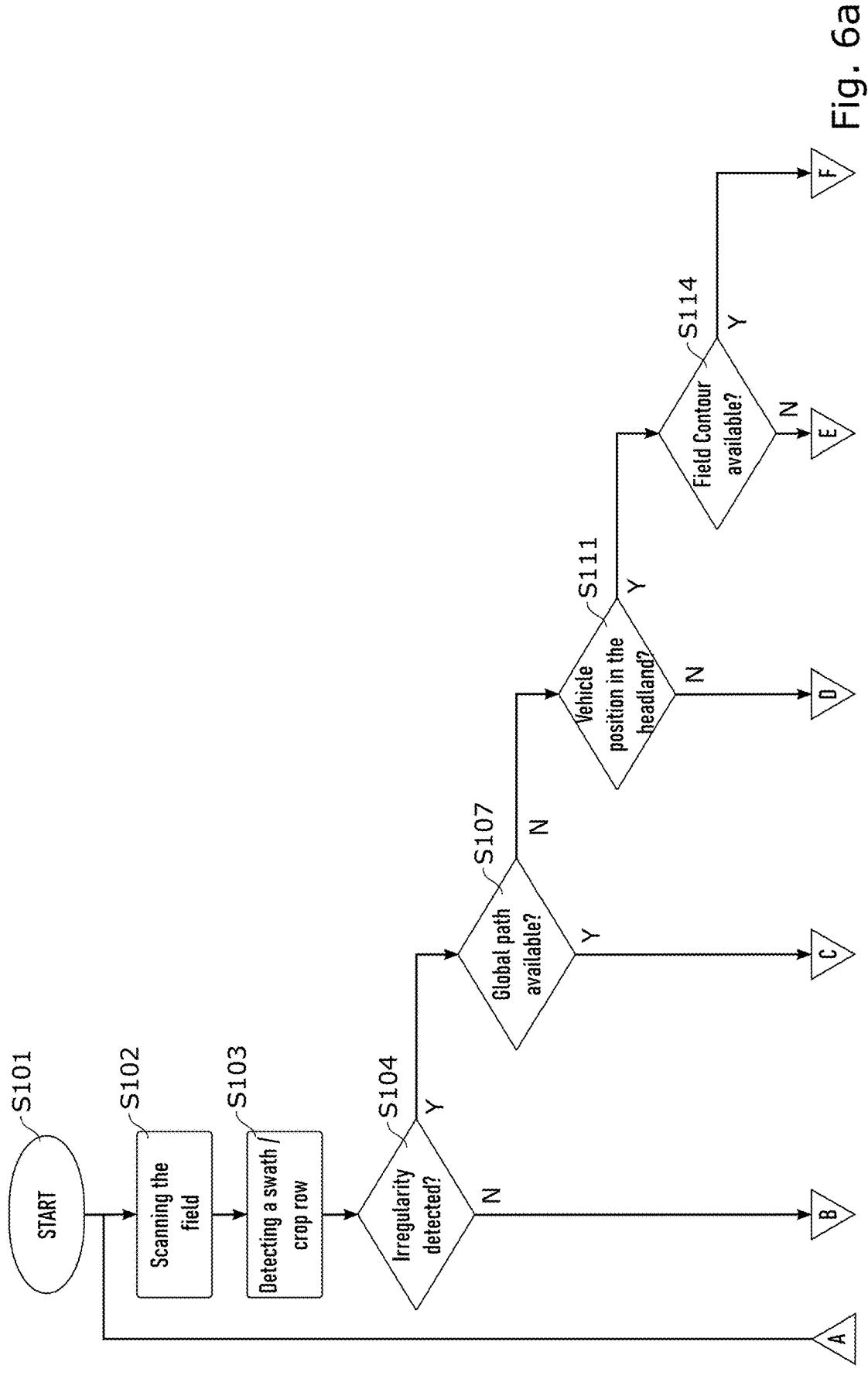
FIG. 6a is a first part of a flowchart illustrating an embodiment of a method of the present invention.
Figure 6B:
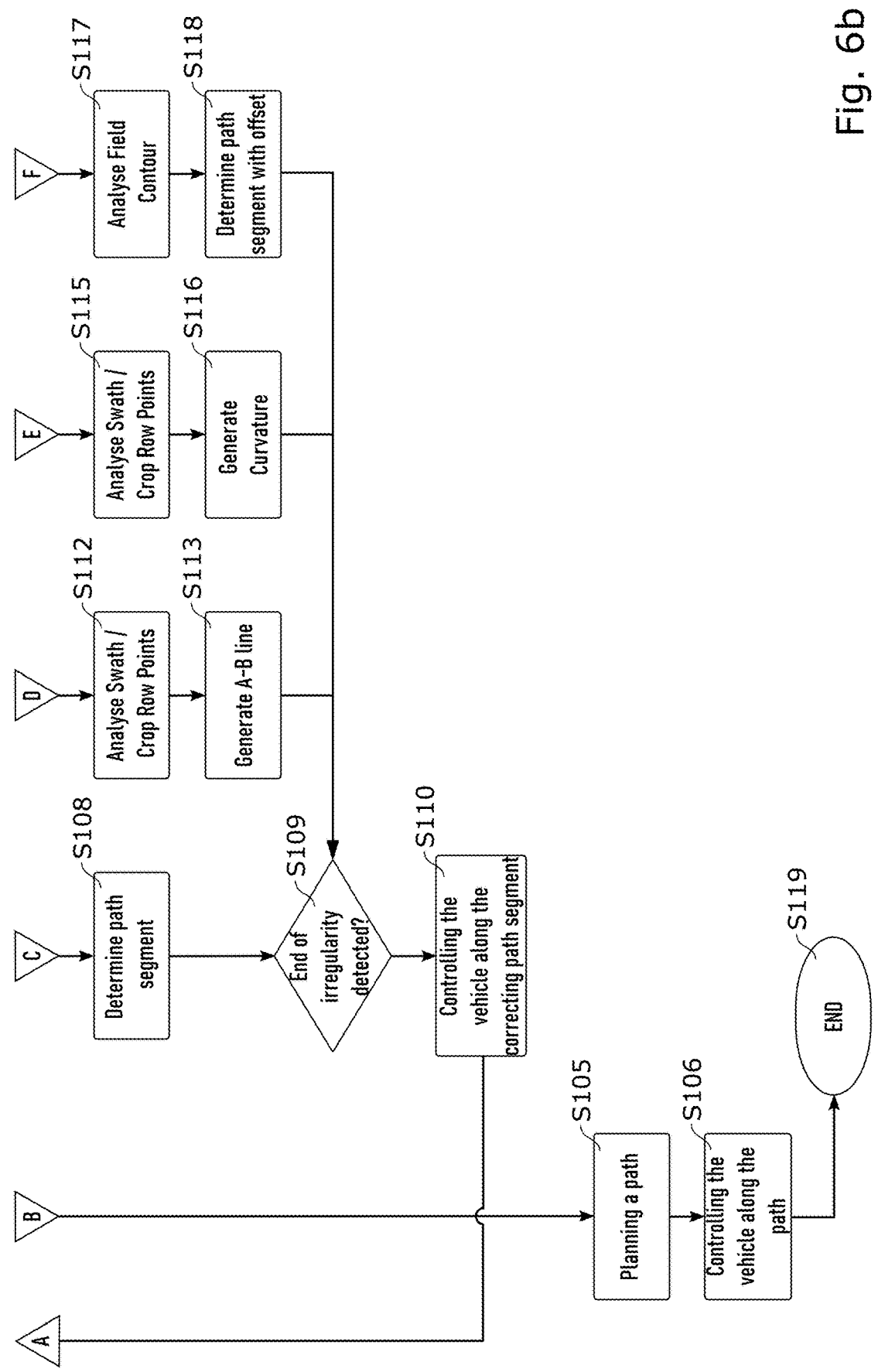
FIG. 6b is a second part of the flowchart of FIG. 6a illustrating an embodiment of a method of the present invention.

FIG. 6*a* and FIG. 6*b* show a flowchart of a method to determine a correcting path segment 19 or 22 to guide the agricultural system 1 towards the end of the irregularity of a swath or a crop row. The method can be stored in the memory 35 and can be carried out by the controller 34 of the control unit 33.

The method starts with step S101 and proceeds with step S102. The control unit 33 commands the environment detection system 4 to continuously scan the field 6 and to send the recorded data to the control unit 33. The data can be stored in the memory 35 of the control unit 33.

Based on the data gathered by the environment detection system 4, the control unit 33, respectively the controller 34, determines the swath 5 the agricultural system 1 is currently moving on at step S103. For example, the controller 34 extracts the edge 10 of the swath 5 from the data and determines the contour of the swath 5 correlated to the edge 10. Instead of the swath 5, a crop row or any other form of crop can be determined.

Analogously, the controller 34 can determine the swaths 7, 8 and 9, the edges 12, 14 and 15 of the swaths 7, 8 and 9 and the contour of each swath 7, 8 and 9 correlated to the edges 12, 14 and 15.

The method proceeds to step S104 and checks whether any irregularity of the swath 5 (or crop row) can be detected. An irregularity is detected by the control unit 33, especially if the swath is disrupted (as depicted in FIGS. 3 and 4) or if the swath is flattened (as depicted in FIG. 5).

If no irregularity is detected by the control unit 33, the method proceeds to step S105 and the control unit 33 plans a path along the swath contour over which the agricultural system 1 shall be guided. The path planning/calculation can be based on path planning methods known from the prior art as mentioned above.

Then, the agricultural system 1 will be guided along the planned path by executing step S106.

If any irregularity of the swath or the crop row is detected, the method according to this invention selects one of multiple path planning procedures to generate a correcting path segment 19 or 22. Which one of the multiple path planning procedures is selected depends on different requirements the method has to check.

A first path planning procedure depends on the availability of a global path 16. As described herein, a global path 16 could be predetermined, for example during a previous operation within the environment. This can include recording of a swath profile during a hay raking operation, for example using the method described in European Patent Application, publication no. EP1769662 A1. This can include recording the swath profile during a previous harvesting operation, for example in the manner as described in European Patent Application No. 20189580.2 in the name of the applicant. This can include recording of a swath profile using an additional remote vehicle, such as a UAV, e.g. in the manner described in European Patent Application No. 20189579.4 in the name of the applicant. The global path 16 may be transferred to the memory 35 of the control unit 33.

So, the method proceeds to step S107 and the control unit 33 checks whether a global path 16 is available in the memory 35.

If a global path 16 is available in the memory 35, the first path planning procedure can be executed. The control unit 33 determines a correcting path segment 19 or 22 from the beginning of the irregularity 20, 23 or 36 at step S108 wherein the correcting path segment 19 or 22 is aligned to the behaviour of the global path 16 as depicted in FIG. 3 to 5. The correcting path segment can fully match with the global path 16 or can be slightly distanced.

The method proceeds to step S109 and the control unit 33 checks if the end of the irregularity of the swath 5 (or the crop row) can be detected out of the data gathered by the environment detection system 4. In case of disconnected or disrupted swaths 5 and 7 as shown in FIG. 3 or FIG. 4, the control unit 33 analyses the data to find a starting point of the second swath 7 as the end of the irregularity 21. In case of a flattened swath 5 as shown in FIG. 5, the control unit 33 analyses the data to find a regular shape of the swath as the end of the irregularity 24 or 37.

If the end of the irregularity could be detected, the method steps to step S105 and plans a path 13 correlated to the second swath 5.2 or 7 (or crop row) as described above whereas the starting point of the planned path is defined by the end of the irregularity 21, 24 or 37.

If the detection of the end of the irregularity failed, the method proceeds to step S110. The control unit 33 causes the agricultural system 1 to move along the correcting path segment 19 or 22 that is aligned to the global path 16 according to the first path planning procedure.

Then, the method steps back to step S102 to scan the field again for detecting the end of the irregularity.

If a global path 16 was not available at step S107, the method checks if a second path planning procedure is executable. The method proceeds to step S111 and the control unit 33 checks if the agricultural system 1 is located in the headland of the field 6. The control unit 33 receives the exact position of the agricultural system 1 from a GPS receiver 38 connected with the tractor 2 and compares this position with map information containing the headland borders of the field 6 stored in the memory 35.

If the agricultural system 1 is not located in the headland, the method proceeds to step S112 to execute the second path planning procedure. The control unit 33 analyses the data gathered by the environment detection system 4 and detects all image points that represent a swath (or a crop row).

Then, the method proceeds to step S113 and the control unit 33 fits an A-B line into the swath contour detected previously at step S103. As described in FIG. 3 for example, this A-B line goes beyond the last detected point of the swath 5 and is used as a new global path 16 on which the agricultural system 1 is guided. For a smooth change between the swath 5 correlated path 11 and the global path 16, the correcting path segment 19 is calculated. This can be a spline that meets the requirements of the kinematics of the agricultural system 1.

The control unit 33 can also calculate additional A-B lines that are aligned parallel to the new global path 16, e. g. for a swath 8 or 9 lying next to the swath 5 as depicted in FIG. 2.

Then, the method steps to step S109 and the control unit 33 checks if the end of the irregularity of the swath 5 (or the crop row) can be detected as described above.

If the detection of the end of the irregularity failed, the method proceeds to step S110 before stepping back to step S102. The control unit 33 causes the agricultural system 1 to move along the correcting path segment 19 or 22 that is aligned to the A-B line according to the second path planning procedure.

Otherwise, the method steps to step S105 and plans a path correlated to the swath (or crop row) as described above whereas the starting point of the planned path is defined by the end of the irregularity 21, 24 or 37.

If the agricultural system 1 is located in the headland, the method checks if a third path planning procedure is executable. The method proceeds to step S114 and the control unit 33 checks if any information about the field contour 25 of the field 6 is available in the memory 35.

If the field contour 25 is not available, the method proceeds with step S115 to execute a third path planning procedure. The control unit 33 analyses the data gathered by the environment detection system 4 and detects all image points that represent a swath (or a crop row).

The control unit 33 then generates a corrective path segment 19 (S116). For example as depicted in FIG. 4, the control unit 33 determines three different points 40, 41 and 42 of the curved part of the swath correlated path 11 through the last detected points (at step S103). Based on these three points 40, 41 and 42 a centre point 39 having the same radius to each of the three points 40, 41 and 42 can be calculated analytically by the control unit 33 (see: Equation of a circle passing through 3 points: http://www.ambrsoft.com/Trigo-Calc/Circle3D.htm). Then, the corrective path segment 19 can be determined as an extrapolation of the curved part of the swath 5 defined by the three points 40, 41 and 42 wherein the radius of the three points 40, 41 and 42 is maintained (i. e. the end point 43 of the corrective path segment 19 located at the end of the irregularity 21 has the same radius as the other three points). So, the circular path that starts from the last point 42 of the path 11 to the point 43 represents the corrected path segment 19.

Then, the method steps to step S109 and the control unit 33 checks if the end of the irregularity of the swath 5 (or the crop row) can be detected as described above.

If the detection of the end of the irregularity failed, the method proceeds to step S110 before stepping back to step S102. The control unit 33 causes the agricultural system 1 to move along the correcting path segment 19 or 22 that is aligned to the curvature according to the third path planning procedure.

Otherwise, the method steps to step S105 and plans a path correlated to the swath (or crop row) as described above whereas the starting point of the planned path is defined by the end of the irregularity 21, 24 or 37.

Figure 7:
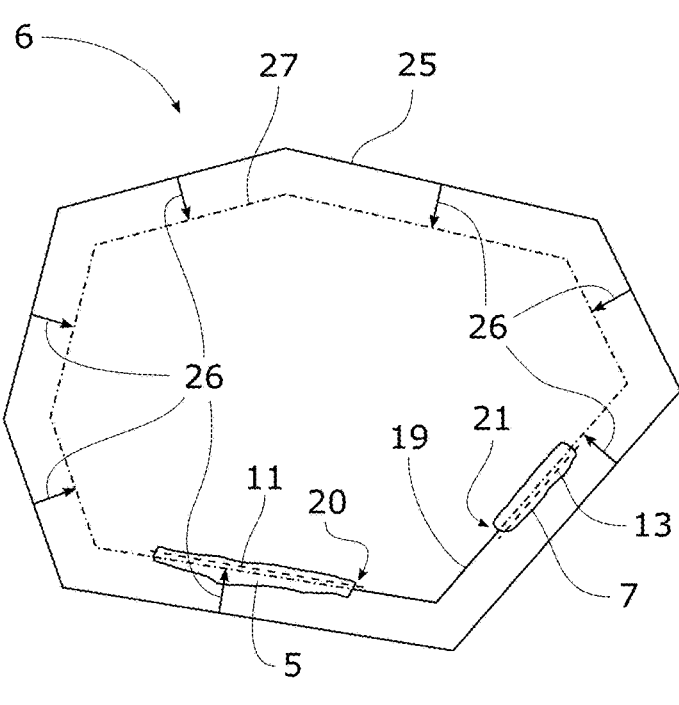
FIG. 7 is a further top-down schematic view of a harvesting environment illustrating one or more aspects of the invention.

If the field contour 25 is available, the method proceeds with step S117 to execute a fourth path planning procedure. As depicted in FIG. 7, the field 6 has a field contour 25 defined by the border of the field 6. The field contour 25 is stored in the memory 35. The swaths 5 and 7 are located in the field 6 spaced from the field contour 25 with an offset 26. The control unit 33 determines the offset 26 based on the distance between the field contour 25 and the path 11 correlated to the swath 5. Alternatively, the control unit 33 determines the offset 26 based on the distance between the current position of the agricultural system 1 in the field 6 provided by the GPS receiver 38 and the field contour 25. In a manual mode, the offset 26 can be defined by the operator.

Then, the control unit 33 determines a path 27 correlated to the field contour 25 wherein the field contour correlated path 27 is spaced from the field contour 25 with the offset 26 (S118). Afterwards, the control unit 33 determines a correcting path segment 19 from the beginning of the irregularity 20 wherein the correcting path segment 19 is aligned to the behaviour of the field contour correlated path 27 as depicted in FIG. 7. The correcting path segment 19 can fully match with the field contour correlated path 27 or can be slightly distanced.

Then, the method steps to step S109 and the control unit 33 checks if the end of the irregularity of the swath 5 (or the crop row) can be detected as described above.

If the detection of the end of the irregularity failed, the method proceeds to step S110 before stepping back to step S102. The control unit 33 causes the agricultural system 1 to move along the correcting path segment 19 that is aligned to the field contour correlated path 27 (spaced from the field contour 25 with the offset 26) according to the forth path planning procedure.

Otherwise, the method steps to step S105 and plans a path correlated to the swath (or crop row) as described above whereas the starting point of the planned path is defined by the end of the irregularity 21 as depicted in FIG. 7.

Finally, when the agricultural system 1 can be guided along a regular swath again (step S106) the method proceeds to step S119 and ends.

Figure 8:
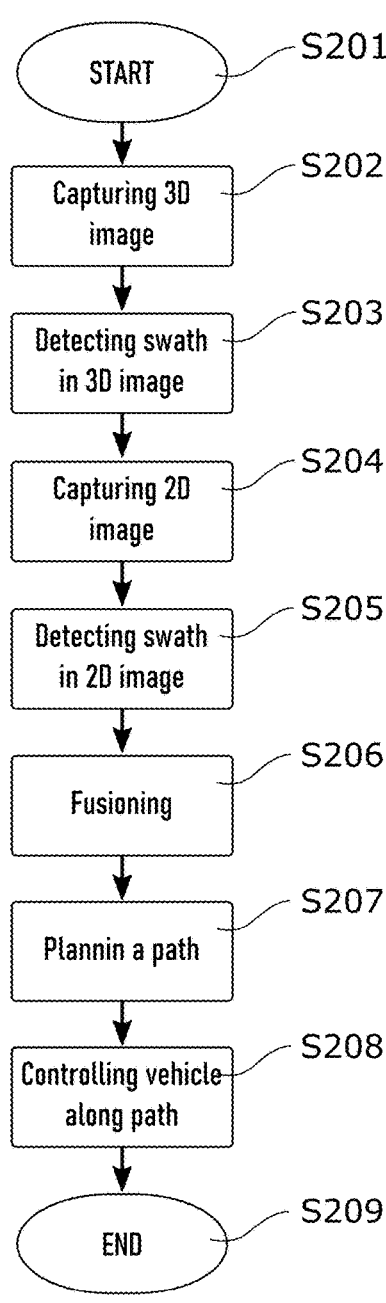
FIG. 8 is a further flowchart illustrating a further embodiment of a method of the present invention.

FIG. 8 shows a method to determine a path through a swath 5 comprising a flattened area 30, for example the irregularities 17 and 18 shown in FIG. 5. The method is stored in the memory 35 and can be carried out by control unit 33 or by the controller 34 respectively.

The method will be explained by the example of a flattened swath whereas any similar irregularity as swath part blown by a wind could be processed by the method. FIG. 10a-10d show how the fusion of 2D and 3D data is done to detect a flattened part 30 of a swath 5 and to create a path 11 to guide the agricultural system 1 centrally over both the flattened part 30 and the non-flattened part 29 of the swath 5. The swath 5 lies on the field 6. The non-flattened part 29 of that swath 5 that looks parabolic. The flattened part 30 of the swath 5 could be unintentionally passed by a machine during a previous task. The contour of the flattened part 29 of the swath 5 is similar to the ground of the field 6.

The method starts with step S201 and proceeds to steps S202. The field 6 is captured by a 3D sensor (S202). The 3D sensor can be integrated in the environment detection system 4. The method proceeds to step S203 to extract and cluster features corresponding to a swath (S203) to distinguish the swath from other objects in the captured 3D data of the field 6 as depicted in FIG. 10b. I. e., the 3D sensor detects the volumetric shape of the non-flattened right part 29 of the swath 5 only, instead of the planar shape of the flattened left part 30 of the swath 5 and determines a corresponding edge 31 of the non-flattened right part of swath 29. Each pixel is assigned to a class, e. g. swath or non-swath.

At step S204, a 2D sensor captures the field 6 in addition to the 3D sensor (S204). The 2D sensor can be integrated in the environment detection system 4. Then, the method proceeds to step S205 to detect the swath 5 in the captured 2D data of the field 6 as depicted in FIG. 10c. In contrast to the 3D sensor data, the flattened part 30 of the swath 5 can be detected in the 2D sensor data so that the edge 10 of the full swath 5 comprising the flattened and the non-flattened parts 29 and 30 can be determined.

But erroneously, an area of the field 6 covered by the edge 32 not representing the swath 5 could be determined as part of the swath 5 as depicted in FIG. 10c. Each pixel is assigned to a class (S205), e.g. swath or non-swath. Related pixels with the same class are combined into one object.

To determine the swath 5 correctly, i. e. without excluding any flattened swath part 30 and without inclusion of any erroneous part 32, the method proceeds to step S206. At step S206, the method fuses the 2D and 3D image data to check which edges (objects) from the 3D image overlap with edges (objects) from the 2D image. Thereby the edges from 2D and 3D having an overlap are merged into one. As can be seen in a comparison of FIG. 10b representing the 3D image data and FIG. 10c representing the 2D image data, edge 31 of FIG. 10b and edge 10 of FIG. 10c overlap. Thus, the swath 5 is determined by the edge 10 as depicted in FIG. 10d.

Edge 32 of FIG. 10c has no overlap with any edge of FIG. 10b and is consequently ignored after the image fusion as shown in FIG. 10d.

From this fusion a path 11 is calculated at the following step S207. Then, the method proceeds to step S208 to guide the agricultural system 1 along the calculated path 11.

Finally, the method ends with step S209.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

It will be appreciated that the above embodiments are discussed by way of example only. Various changes and modifications can be made without departing from the scope of the present application.

The invention claimed is:

1. A method of guiding movement of an agricultural system within a field, the method comprising:

receiving sensor data indicative of an environment of an agricultural system, the sensor data comprising two-dimensional (2D) image data and three-dimensional (3D) image data;

fusing the 2D image data and the 3D image data and identifying overlapping edges by identifying which edges from the 3D image data overlap with edges from the 2D image data;

merging the overlapping edges of the 3D image data and the 2D image data into merged edges;

identifying, from the sensor data and based at least partially on the merged edges, a material profile of a swath windrow of previously processed crop material along which the agricultural system shall be guided;

determining at least one property of the material profile from the sensor data indicative of an irregularity in the material profile;

determining whether a global path is available, wherein the global path is predetermined based at least partially on at least one of:

previous operations performed within the environment; and previously collected sensed data of the environment;

responsive to a determination that the global path is available, determining a correcting path segment with respect to the global path for guiding movement of the agricultural system with respect to the irregularity in the material profile;

responsive to a determination that the global path is not available, performing one or more alternative path planning procedures, comprising:

determining whether the agricultural system is located in a headland of the environment;

determining whether a field contour is available;

based at least partially on whether or not the agricultural system is determined to be located in a headland of the environment and whether or not a field contour is available, determining an alternative correcting path segment; and controlling movement of the agricultural system along one of the correcting path segment or the alternative correcting path segment.

2. The method of claim 1, comprising identifying, from the sensor data, an end of a material profile irregularity and determining the correcting path segment in dependence thereon.

3. The method of claim 1, wherein the material profile irregularity comprises disrupted material; flattened material; or a misalignment of the material with respect to a global path.

4. The method of claim 1, wherein determining a correcting path segment with respect to the global path comprises:

determining a guidance path between a current location of the agricultural system and the global path;

determining a guidance path from a position where the irregularity in the material profile began and following a profile of the global path; and/or determining a guidance path between the position where the irregularity of the material profile began and a position on the global path corresponding to an end of the material profile irregularity.

5. The method of claim 1, further comprising:

responsive to a determination that the agricultural system is not located in a headland of the environment, performing a second path planning procedure.

6. The method of claim 5, wherein the second path planning procedure comprises:

analysing the sensor data;

determining at least one data point which correspond to material within the environment; and determining a global path in dependence on an identification of a section of material within the environment.

7. The method of claim 1, further comprising:

responsive to a determination that the agricultural system is located in a headland of the environment, performing a third or fourth path planning procedure.

8. The method of claim 1, further comprising:

responsive to information indicative of the field contour not being available, performing a third path planning procedure comprising:

analyzing the sensor data to determine at least one data point which corresponds to material within the environment;

identifying a curved contour of material traversed or to be traversed by the agricultural system;

determining a radius of curvature of the curved contour; and determining a correcting path segment as an extension of a (part) circular path passing through the points of the curved contour and extending from a beginning of the irregularity in the material profile at least partly towards an end of the irregularity in the material profile.

9. The method of claim 1, further comprising:

determining whether information indicative of a contour of the field is available; and when the information indicative of the field contour is available, performing a fourth path planning procedure comprising:

determining an offset distance between a boundary of the field with respect to at least one section of material corresponding to a regular material profile; and determining a correcting path segment as a guidance path correlated to the field contour and starting from a beginning of the irregularity in the material profile;

wherein the field contour correlated guidance path is spaced from the boundary by the offset distance, or at least in dependence on the offset distance.

10. The method of claim 1, further comprising:

receiving sensor data from a sensor having a three-dimensional sensing region;

receiving sensor data from a sensor having a two-dimensional sensing region; and determining the at least one material property from a fusion of sensor data from the sensor having a three-dimensional sensing region and the sensor having a two-dimensional sensing region.

11. The method of claim 3, wherein, responsive to the material profile irregularity comprising disrupted material, determining an end of the material profile irregularity at a point where a region of uniform or regular material ahead of the agricultural system is identified in the sensor data, and wherein, responsive to the material profile irregularity comprising flattened material, determining an end of the material profile irregularity at a point where the profile is no longer flattened.

12. The method of claim 1, further comprising determining a primary guidance path for the agricultural system for a region of the field beyond the material profile irregularity, where the beginning of the primary guidance path is defined at an end of the material profile irregularity.

13. A control system for controlling movement of an agricultural system within a field, the control system comprising one or more controllers configured to:

receive sensor data indicative of an environment of an agricultural system, the sensor data comprising two-dimensional (2D) image data and three-dimensional (3D) image data;

fusing the 2D image data and the 3D image data and identifying overlapping edges by identifying which edges from the 3D image data overlap with edges from the 2D image data;

merging the overlapping edges of the 3D image data and the 2D image data into merged edges;

identify, from the sensor data and based at least partially on the merged edges, a material profile of a swath windrow of previously processed crop material along which movement of the agricultural system shall be guided;

determine at least one property of the material profile indicative of an irregularity in the material profile;

determine whether a global path is available, wherein the global path is predetermined based at least partially on at least one of:

previous operations performed within the environment; and previously collected sensed data of the environment;

responsive to a determination that the global path is available, determine a correcting path segment with respect to the global path for guiding movement of the agricultural system with respect to the determined material profile irregularity;

responsive to a determination that the global path is not available, perform one or more alternative path planning procedures, comprising, determining whether or not the agricultural system is located in a headland of the environment;

determining whether a field contour is available;

based at least partially on whether or not the agricultural system is determined to be located in a headland of the environment and whether or not a field contour is available, determining an alternative correcting path segment; and control movement of the agricultural system along one of the correcting path segment or the alternative correcting path segment.

14. An agricultural system comprising:

a control system comprising one or more controllers configured to:

receive sensor data indicative of an environment of an agricultural system, the sensor data comprising two-dimensional (2D) image data and three-dimensional (3D) image data;

fuse the 2D image data and the 3D image data and identify overlapping edges by identifying which edges from the 3D image data overlap with edges from the 2D image data;

merge the overlapping edges of the 3D image data and the 2D image data into merged edges;

identify, from the sensor data and based at least partially on the merged edges, a material profile of a swath windrow of previously processed crop material along which movement of the agricultural system shall be guided;

determine at least one property of the material profile indicative of an irregularity in the material profile;

determine whether a global path is available, wherein the global path is predetermined based at least partially on at least one of:

previous operations performed within the environment; and previously collected sensed data of the environment;

responsive to a determination that the global path is available, determine a correcting path segment with respect to the global path for guiding movement of the agricultural system with respect to the determined material profile irregularity;

responsive to a determination that the global path is not available, perform one or more alternative path planning procedures, comprising:

determining whether or not the agricultural system is located in a headland of the environment;

determining whether a field contour is available; and based at least partially on whether or not the agricultural system is determined to be located in a headland of the environment and whether or not a field contour is available, determining an alternative correcting path segment; and control movement of the agricultural system along one of the correcting path segment or the alternative correcting path segment.

15. The method of claim 1, further comprising determining the correcting path segment between a location of the agricultural system and an end of the material profile irregularity to guide the agricultural system from a current location to a primary guidance path.

* * * * *